(12) United States Patent
Sasaki

(10) Patent No.: US 7,596,263 B2
(45) Date of Patent: Sep. 29, 2009

(54) IMAGE TRANSMITTING APPARATUS, IMAGE RECEIVING APPARATUS, AND IMAGE TRANSMISSION SYSTEM

(75) Inventor: Hisashi Sasaki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 739 days.

(21) Appl. No.: 11/375,238

(22) Filed: Mar. 15, 2006

(65) Prior Publication Data

US 2006/0222241 A1   Oct. 5, 2006

(30) Foreign Application Priority Data

Mar. 15, 2005   (JP)   ............... 2005-073812

(51) Int. Cl.
G06K 9/36 (2006.01)
G06K 9/46 (2006.01)
(52) U.S. Cl. ............... 382/162; 382/166; 382/244
(58) Field of Classification Search ........... 382/162, 382/166, 167, 244, 245, 246, 247, 266, 267, 382/268, 269, 274; 348/400.1, 401.1, 402.1, 348/403.1, 404.1, 405.1, 409.1, 410.1, 411.1; 386/109
See application file for complete search history.

(56) References Cited

U.S. PATENT DOCUMENTS

| | | | | |
|---|---|---|---|---|
| 4,857,991 A | * | 8/1989 | Music et al. ........... | 375/240.01 |
| 4,857,993 A | * | 8/1989 | Music et al. ........... | 375/240.01 |
| 5,974,464 A | | 10/1999 | Shin et al. | |
| 6,344,850 B1 | | 2/2002 | Okumura et al. | |
| 6,369,825 B1 | | 4/2002 | Nakano | |
| 6,633,243 B2 | | 10/2003 | Mair et al. | |
| 7,369,284 B1 | * | 5/2008 | Inuzuka et al. ........... | 358/512 |
| 7,447,354 B2 | * | 11/2008 | Sasaki et al. ........... | 382/166 |
| 7,469,069 B2 | * | 12/2008 | Kim et al. ........... | 382/236 |
| 2005/0226500 A1 | | 10/2005 | Sasaki et al. | |

FOREIGN PATENT DOCUMENTS

| | | |
|---|---|---|
| JP | 2000-20031 | 1/2000 |
| JP | 2000-152129 | 5/2000 |
| JP | 2002-202760 | 7/2002 |
| JP | 2002-366107 | 12/2002 |
| JP | 2003-44017 | 2/2003 |

OTHER PUBLICATIONS

Eran A. Edirisinghe, et al., "Improvements to JPEG-LS Via Diagonal Edge Based Prediction", Proceedings of SPIE, vol. 4671, 2002, pp. 604-613.

(Continued)

*Primary Examiner*—Brian Q Le
(74) *Attorney, Agent, or Firm*—Oblon, Spivak, McClelland, Maier & Neustadt, L.L.P.

(57) ABSTRACT

An image transmitter has a color difference differential calculating unit configured to calculate color difference differential data relating to a difference between a current predicting value predicted based on previous image data and current actual image data, a multi-valued generator configured to generate multi-valued data corresponding to the color difference differential data based on the color difference differential data, statistical properties of the image data and a signal amplitude of the multi-valued data to be generated, and a transmitter configured to transmit the multi-valued data through at least one transmission line.

20 Claims, 27 Drawing Sheets

CURRENT DISTRIBUTION OF OAC4 IN 1V PREDICTION

OTHER PUBLICATIONS

Richard McCartney, et al., "9.3: WhisperBus™: An Advanced Interconnect Link for TFT Column Driver Data", SID Symp. Digest, 2001, pp. 1-4.

A. Lee, et al., "6.2: Integrated TFT-LCD Timing Controllers with RSDS Column Driver Interface", SID Symp. Digest, 2000, pp. 43-45.

K. Yusa, et al., "9.4: High-Speed I/F for TFT-LCD Source Driver IC by CMADS™ (Current Mode Advanced Differential Signaling)", SID Symp. Digest, 2001, pp. 111-113.

"Serial Interface: Its Penetration is Boosted Up by Revolver System, Which Reduces Wire Count to Less than 1/10", Nikkei Electronics, No. 869, Mar. 15, 2004, pp. 128-130 and Table of Contents p. 6.

Jun Yang, et al., "FV Encoding for Low-Power Data I/O", IEEE ISLPED 2001, 6 pages.

Haruhiko Okumura, et al., "P-53: Vertically Differential EMI Suppression Method for High-Resolution LCDs", SID IDRC, 2003, pp. 329-332.

J. Jiang, et al., "Revisiting the JPEG-LS Prediction Scheme", IEE Proc.-Vis. Image Signal Process, vol. 147, No. 6, Dec. 2000, pp. 575-580.

C. Grecos, et al., "Two Low Cost Algorithms for Improved Diagonal Edge Detection in JPEG-LS", IEEE Transactions on Consumer Electronics, vol. 47, No. 3, Aug. 2001, pp. 466-473.

Jianmin Jiang, et al., "Towards Improved Prediction Accuracy in JPEG-LS", SPIE Optical Engineering, vol. 41, No. 2, Feb. 2002, pp. 335-341.

D. Salomon, et al., "4.9 JPEG-LS", Data Compression, $3^{rd}$ Edition, 2004, pp. 346-352.

Digital Visual Interface DVI, Revision 1.0, Apr. 2, 1999, pp. 1-76; http://www.ddwg.org.

Wei-Chung Cheng, et al., "Chromatic Encoding: A Low Power Encoding Technique for Digital Visual Interface", IEEE 2003, Session 6.3, 6 pages.

Alberto Bocca, et al., "Energy-Efficient Bus Encoding for LCD Displays", IEEE/ACM GLSVLSI, Apr. 2004, pp. 240-243.

Sabino Salerno, et al., "Limited Intra-Word Transition Codes: An Energy-Efficient Bus Encoding for LCD Display Interfaces", IEEE/ACM ISLPED, Session 7.4, Aug. 9-11, 2004, pp. 206-211.

Hisashi Sasaki, et al., "9-3: Multi-Valued Image Entropy Coding for Input-Width Reduction of LCD Source Drivers", SID Asia Display/IMID, 2004, 4 pages.

U.S. Appl. No. 11/483,277, filed Jul. 10, 2006, Sasaki, et al.

\* cited by examiner

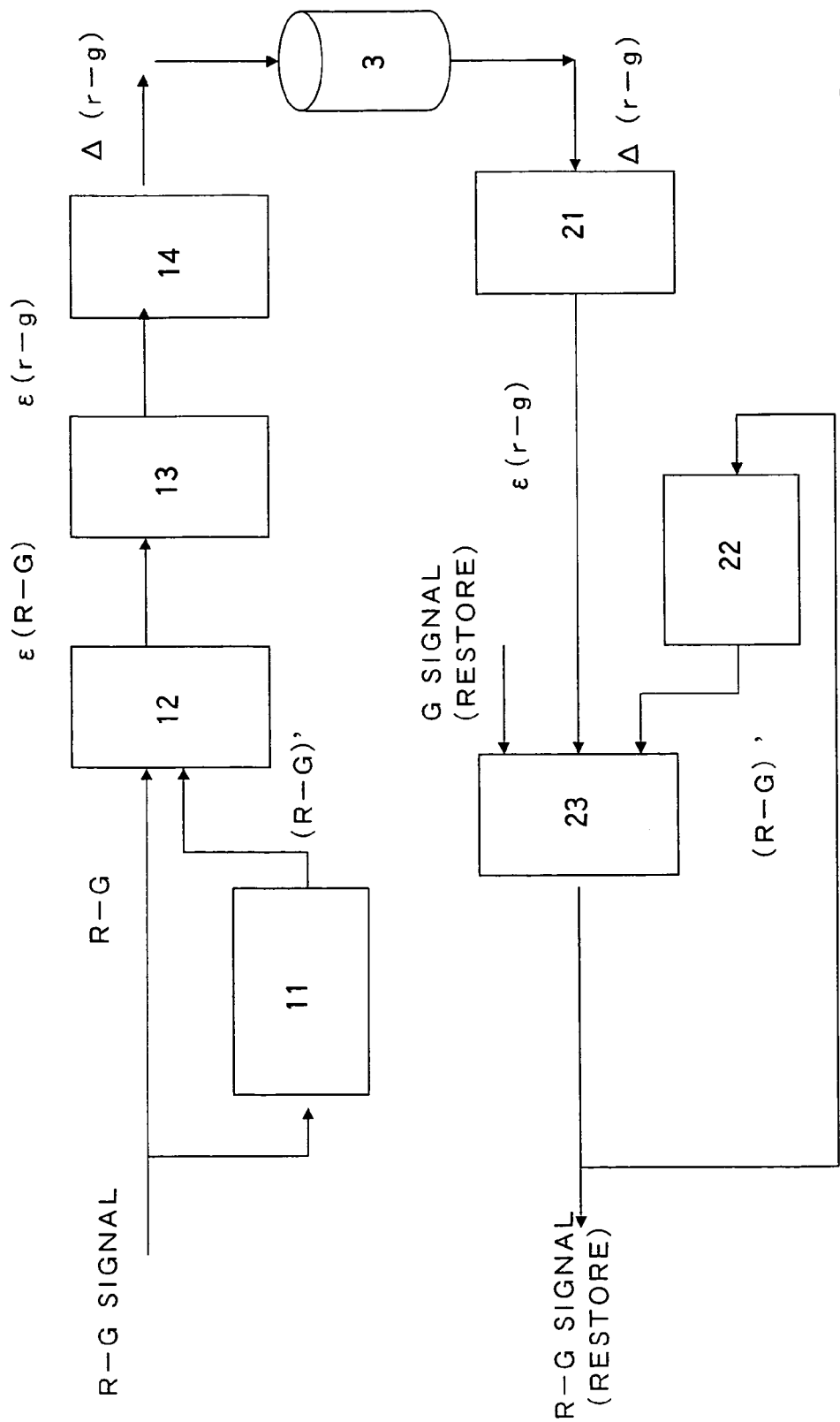
F I G. 2

| CODE GR | INPUT RANGE | QUANTITY | CODE AVERAGE AMPLITUDE |
|---|---|---|---|
| 0 | 0 | 1 | 0 |
| 1 | +1~-2 | 4 | 0.25 |
| 2 | +3~-7 | 10 | 0.5 |
| 3 | +8~-17 | 20 | 0.75 |
| 4 | +18~+33 | 31 | 1 |
| 5 | -33~+53 | 40 | 1.25 |
| 6 | -53~+75 | 44 | 1.5 |
| 7 | -75~95 | 40 | 1.75 |
| 8 | -95~-110 | 31 | 2 |
| 9 | +111~-120 | 20 | 2.25 |
| 10 | +121~-125 | 10 | 2.5 |
| 11 | +126~-127 | 4 | 2.75 |
| 12 | +128(-128) | 1 | 3 |

FIG. 3

GROUP 0

| Δ3 | Δ2 | Δ1 | Δ0 | AVERAGE AMPLITUDE |
|---|---|---|---|---|
| 0 | 0 | 0 | 0 | 0 |

F I G. 4

GROUP 1

| Δ3 | Δ2 | Δ1 | Δ0 | AVERAGE AMPLITUDE |
|---|---|---|---|---|
| 0 | 0 | 0 | 1 | 0.25 |
| 0 | 0 | 1 | 0 | 0.25 |
| 0 | 1 | 0 | 0 | 0.25 |
| 1 | 0 | 0 | 0 | 0.25 |

F I G. 5

GROUP 2

| Δ3 | Δ2 | Δ1 | Δ0 | AVERAGE AMPLITUDE |
|---|---|---|---|---|
| 0 | 0 | 0 | 2 | 0.5 |
| 0 | 0 | 1 | 1 | 0.5 |
| 0 | 0 | 2 | 0 | 0.5 |
| 0 | 1 | 0 | 1 | 0.5 |
| 0 | 1 | 1 | 0 | 0.5 |
| 0 | 2 | 0 | 0 | 0.5 |
| 1 | 0 | 0 | 1 | 0.5 |
| 1 | 0 | 1 | 0 | 0.5 |
| 1 | 1 | 0 | 0 | 0.5 |
| 2 | 0 | 0 | 0 | 0.5 |

F I G. 6

GROUP 3

| Δ3 | Δ2 | Δ1 | Δ0 | AVERAGE AMPLITUDE |
|---|---|---|---|---|
| 0 | 0 | 0 | 3 | 0.75 |
| 0 | 0 | 1 | 2 | 0.75 |
| 0 | 0 | 2 | 1 | 0.75 |
| 0 | 0 | 3 | 0 | 0.75 |
| 0 | 1 | 0 | 2 | 0.75 |
| 0 | 1 | 1 | 1 | 0.75 |
| 0 | 1 | 2 | 0 | 0.75 |
| 0 | 2 | 0 | 1 | 0.75 |
| 0 | 2 | 1 | 0 | 0.75 |
| 0 | 3 | 0 | 0 | 0.75 |
| 1 | 0 | 0 | 2 | 0.75 |
| 1 | 0 | 1 | 1 | 0.75 |
| 1 | 0 | 2 | 0 | 0.75 |
| 1 | 1 | 0 | 1 | 0.75 |
| 1 | 1 | 1 | 0 | 0.75 |
| 1 | 2 | 0 | 0 | 0.75 |
| 2 | 0 | 0 | 1 | 0.75 |
| 2 | 0 | 1 | 0 | 0.75 |
| 2 | 1 | 0 | 0 | 0.75 |
| 3 | 0 | 0 | 0 | 0.75 |

F I G. 7

GROUP 4

| Δ3 | Δ2 | Δ1 | Δ0 | AVERAGE AMPLITUDE |
|---|---|---|---|---|
| 0 | 0 | 1 | 3 | 1 |
| 0 | 0 | 2 | 2 | 1 |
| 0 | 0 | 3 | 1 | 1 |
| 0 | 1 | 0 | 3 | 1 |
| 0 | 1 | 1 | 2 | 1 |
| 0 | 1 | 2 | 1 | 1 |
| 0 | 1 | 3 | 0 | 1 |
| 0 | 2 | 0 | 2 | 1 |
| 0 | 2 | 1 | 1 | 1 |
| 0 | 2 | 2 | 0 | 1 |
| 0 | 3 | 0 | 1 | 1 |
| 0 | 3 | 1 | 0 | 1 |
| 1 | 0 | 0 | 3 | 1 |
| 1 | 0 | 1 | 2 | 1 |
| 1 | 0 | 2 | 1 | 1 |
| 1 | 0 | 3 | 0 | 1 |
| 1 | 1 | 0 | 2 | 1 |
| 1 | 1 | 1 | 1 | 1 |
| 1 | 1 | 2 | 0 | 1 |
| 1 | 2 | 0 | 1 | 1 |
| 1 | 2 | 1 | 0 | 1 |
| 1 | 3 | 0 | 0 | 1 |
| 2 | 0 | 0 | 2 | 1 |
| 2 | 0 | 1 | 1 | 1 |
| 2 | 0 | 2 | 0 | 1 |
| 2 | 1 | 0 | 1 | 1 |
| 2 | 1 | 1 | 0 | 1 |
| 2 | 2 | 0 | 0 | 1 |
| 3 | 0 | 0 | 1 | 1 |
| 3 | 0 | 1 | 0 | 1 |
| 3 | 1 | 0 | 0 | 1 |

GROUP 5

| Δ3 | Δ2 | Δ1 | Δ0 | AVERAGE AMPLITUDE |
|----|----|----|----|-------------------|
| 0 | 0 | 2 | 3 | 1.25 |
| 0 | 0 | 3 | 2 | 1.25 |
| 0 | 1 | 1 | 3 | 1.25 |
| 0 | 1 | 2 | 2 | 1.25 |
| 0 | 1 | 3 | 1 | 1.25 |
| 0 | 2 | 0 | 3 | 1.25 |
| 0 | 2 | 1 | 2 | 1.25 |
| 0 | 2 | 2 | 1 | 1.25 |
| 0 | 2 | 3 | 0 | 1.25 |
| 0 | 3 | 0 | 2 | 1.25 |
| 0 | 3 | 1 | 1 | 1.25 |
| 0 | 3 | 2 | 0 | 1.25 |
| 1 | 0 | 1 | 3 | 1.25 |
| 1 | 0 | 2 | 2 | 1.25 |
| 1 | 0 | 3 | 1 | 1.25 |
| 1 | 1 | 0 | 3 | 1.25 |
| 1 | 1 | 1 | 2 | 1.25 |
| 1 | 1 | 2 | 1 | 1.25 |
| 1 | 1 | 3 | 0 | 1.25 |
| 1 | 2 | 0 | 2 | 1.25 |
| 1 | 2 | 1 | 1 | 1.25 |
| 2 | 0 | 0 | 3 | 1.25 |
| 2 | 0 | 1 | 2 | 1.25 |
| 2 | 0 | 2 | 1 | 1.25 |
| 2 | 0 | 3 | 0 | 1.25 |
| 2 | 1 | 0 | 2 | 1.25 |
| 2 | 1 | 1 | 1 | 1.25 |
| 2 | 1 | 2 | 0 | 1.25 |
| 2 | 2 | 0 | 1 | 1.25 |
| 2 | 2 | 1 | 0 | 1.25 |
| 2 | 3 | 0 | 0 | 1.25 |
| 3 | 0 | 0 | 2 | 1.25 |
| 3 | 0 | 1 | 1 | 1.25 |
| 3 | 0 | 2 | 0 | 1.25 |
| 3 | 1 | 0 | 1 | 1.25 |
| 3 | 1 | 1 | 0 | 1.25 |
| 3 | 2 | 0 | 0 | 1.25 |

(Upper table)

| Δ3 | Δ2 | Δ1 | Δ0 | AVERAGE AMPLITUDE |
|---|---|---|---|---|
| 2 | 2 | 0 | 3 | 1.75 |
| 2 | 2 | 1 | 2 | 1.75 |
| 2 | 2 | 2 | 1 | 1.75 |
| 2 | 2 | 3 | 0 | 1.75 |
| 2 | 3 | 0 | 2 | 1.75 |
| 2 | 3 | 1 | 1 | 1.75 |
| 2 | 3 | 2 | 0 | 1.75 |
| 3 | 0 | 0 | 3 | 1.75 |
| 3 | 0 | 1 | 2 | 1.75 |
| 3 | 0 | 2 | 1 | 1.75 |
| 3 | 1 | 0 | 3 | 1.75 |
| 3 | 1 | 1 | 2 | 1.75 |
| 3 | 1 | 2 | 1 | 1.75 |
| 3 | 1 | 3 | 0 | 1.75 |
| 3 | 2 | 0 | 2 | 1.75 |
| 3 | 2 | 1 | 1 | 1.75 |
| 3 | 2 | 2 | 0 | 1.75 |
| 3 | 3 | 0 | 1 | 1.75 |
| 3 | 3 | 1 | 0 | 1.75 |

GROUP 7

| Δ3 | Δ2 | Δ1 | Δ0 | AVERAGE AMPLITUDE |
|---|---|---|---|---|
| 0 | 1 | 3 | 3 | 1.75 |
| 0 | 2 | 2 | 3 | 1.75 |
| 0 | 2 | 3 | 2 | 1.75 |
| 0 | 3 | 1 | 3 | 1.75 |
| 0 | 3 | 2 | 2 | 1.75 |
| 0 | 3 | 3 | 1 | 1.75 |
| 1 | 0 | 3 | 3 | 1.75 |
| 1 | 1 | 2 | 3 | 1.75 |
| 1 | 1 | 3 | 2 | 1.75 |
| 1 | 2 | 1 | 3 | 1.75 |
| 1 | 2 | 2 | 2 | 1.75 |
| 1 | 2 | 3 | 1 | 1.75 |
| 1 | 3 | 0 | 3 | 1.75 |
| 1 | 3 | 1 | 2 | 1.75 |
| 1 | 3 | 2 | 1 | 1.75 |
| 2 | 0 | 2 | 3 | 1.75 |
| 2 | 0 | 3 | 2 | 1.75 |
| 2 | 1 | 1 | 3 | 1.75 |
| 2 | 1 | 2 | 2 | 1.75 |
| 2 | 1 | 3 | 1 | 1.75 |

FIG. 12

GROUP 8

| Δ3 | Δ2 | Δ1 | Δ0 | AVERAGE AMPLITUDE |
|---|---|---|---|---|
| 0 | 2 | 3 | 3 | 2 |
| 0 | 3 | 2 | 3 | 2 |
| 0 | 3 | 3 | 2 | 2 |
| 1 | 1 | 3 | 3 | 2 |
| 1 | 2 | 2 | 2 | 2 |
| 1 | 2 | 3 | 3 | 2 |
| 1 | 3 | 1 | 2 | 2 |
| 1 | 3 | 2 | 1 | 2 |
| 2 | 0 | 3 | 3 | 2 |
| 2 | 1 | 2 | 3 | 2 |
| 2 | 1 | 3 | 2 | 2 |
| 2 | 2 | 1 | 3 | 2 |
| 2 | 2 | 2 | 2 | 2 |
| 2 | 2 | 3 | 1 | 2 |
| 2 | 3 | 0 | 3 | 2 |

| Δ3 | Δ2 | Δ1 | Δ0 | AVERAGE AMPLITUDE |
|---|---|---|---|---|
| 2 | 3 | 1 | 2 | 2 |
| 2 | 3 | 2 | 1 | 2 |
| 3 | 0 | 2 | 3 | 2 |
| 3 | 0 | 3 | 2 | 2 |
| 3 | 1 | 1 | 3 | 2 |
| 3 | 1 | 2 | 2 | 2 |
| 3 | 1 | 3 | 1 | 2 |
| 3 | 2 | 0 | 3 | 2 |
| 3 | 2 | 1 | 2 | 2 |
| 3 | 2 | 2 | 1 | 2 |
| 3 | 2 | 3 | 0 | 2 |
| 3 | 3 | 0 | 2 | 2 |
| 3 | 3 | 1 | 1 | 2 |
| 3 | 3 | 2 | 0 | 2 |

GROUP 9

| Δ3 | Δ2 | Δ1 | Δ0 | AVERAGE AMPLITUDE |
|---|---|---|---|---|
| 0 | 3 | 3 | 3 | 2.25 |
| 1 | 2 | 3 | 3 | 2.25 |
| 1 | 3 | 2 | 3 | 2.25 |
| 1 | 3 | 3 | 2 | 2.25 |
| 2 | 1 | 3 | 3 | 2.25 |
| 2 | 2 | 2 | 3 | 2.25 |
| 2 | 2 | 3 | 2 | 2.25 |
| 2 | 3 | 1 | 3 | 2.25 |
| 2 | 3 | 2 | 2 | 2.25 |
| 2 | 3 | 3 | 1 | 2.25 |
| 3 | 0 | 3 | 3 | 2.25 |
| 3 | 1 | 2 | 3 | 2.25 |
| 3 | 1 | 3 | 2 | 2.25 |
| 3 | 2 | 1 | 3 | 2.25 |
| 3 | 2 | 2 | 2 | 2.25 |
| 3 | 2 | 3 | 1 | 2.25 |
| 3 | 3 | 0 | 3 | 2.25 |
| 3 | 3 | 1 | 2 | 2.25 |
| 3 | 3 | 2 | 1 | 2.25 |
| 3 | 3 | 3 | 0 | 2.25 |

FIG. 13

GROUP 10

| Δ3 | Δ2 | Δ1 | Δ0 | AVERAGE AMPLITUDE |
|---|---|---|---|---|
| 1 | 3 | 3 | 3 | 2.5 |
| 2 | 2 | 3 | 3 | 2.5 |
| 2 | 3 | 2 | 3 | 2.5 |
| 2 | 3 | 3 | 2 | 2.5 |
| 3 | 1 | 3 | 3 | 2.5 |
| 3 | 2 | 2 | 3 | 2.5 |
| 3 | 2 | 3 | 2 | 2.5 |
| 3 | 3 | 1 | 3 | 2.5 |
| 3 | 3 | 2 | 2 | 2.5 |
| 3 | 3 | 3 | 1 | 2.5 |

FIG. 14

GROUP 11

| Δ3 | Δ2 | Δ1 | Δ0 | AVERAGE AMPLITUDE |
|---|---|---|---|---|
| 2 | 3 | 3 | 3 | 2.75 |
| 3 | 2 | 3 | 3 | 2.75 |
| 3 | 3 | 2 | 3 | 2.75 |
| 3 | 3 | 3 | 2 | 2.75 |

FIG. 15

GROUP 12

| Δ3 | Δ2 | Δ1 | Δ0 | AVERAGE AMPLITUDE |
|---|---|---|---|---|
| 3 | 3 | 3 | 3 | 3 |

FIG. 16

| DIFFERENCE ε | Δ3 | Δ2 | Δ1 | Δ0 | AVERAGE AMPLITUDE | PROBABILITY p (ε) |
|---|---|---|---|---|---|---|
| 0 | 0 | 0 | 0 | 0 | 0 | p(0) |
| 1 | 0 | 0 | 0 | 1 | 0.25 | p(1) |
| -1 | 0 | 0 | 1 | 0 | 0.25 | p(-1) |
| 2 | 0 | 1 | 0 | 0 | 0.25 | p(2) |
| -2 | 1 | 0 | 0 | 0 | 0.25 | p(-2) |
| 3 | 0 | 0 | 0 | 2 | 0.50 | p(3) |
| -3 | 0 | 0 | 1 | 1 | 0.50 | p(-3) |
| 4 | 0 | 0 | 2 | 0 | 0.50 | p(4) |
| ... | | | | | | |

F I G. 17

| id | num | Δ3 | Δ2 | Δ1 | Δ0 | ave of amp |
|---|---|---|---|---|---|---|
| 1 | 0 | 0 | 0 | 0 | 0 | 0 |
| 2 | 1 | 0 | 0 | 0 | 1 | 0.25 |
| 3 | -1 | 0 | 0 | 1 | 0 | 0.25 |
| 4 | 2 | 0 | 1 | 0 | 0 | 0.25 |
| 5 | -2 | 1 | 0 | 0 | 0 | 0.25 |
| 6 | 3 | 0 | 0 | 0 | 2 | 0.5 |
| 7 | -3 | 0 | 0 | 1 | 1 | 0.5 |
| 8 | 4 | 0 | 0 | 2 | 0 | 0.5 |
| 9 | -4 | 0 | 1 | 0 | 1 | 0.5 |
| 10 | 5 | 0 | 1 | 1 | 0 | 0.5 |
| 11 | -5 | 0 | 2 | 0 | 0 | 0.5 |
| 12 | 6 | 1 | 0 | 0 | 1 | 0.5 |
| 13 | -6 | 1 | 0 | 1 | 0 | 0.5 |
| 14 | 7 | 1 | 1 | 0 | 0 | 0.5 |
| 15 | -7 | 2 | 0 | 0 | 0 | 0.5 |
| 16 | 8 | 0 | 0 | 0 | 3 | 0.75 |
| 17 | -8 | 0 | 0 | 1 | 2 | 0.75 |
| 18 | 9 | 0 | 0 | 2 | 1 | 0.75 |
| 19 | -9 | 0 | 0 | 3 | 0 | 0.75 |
| 20 | 10 | 0 | 1 | 0 | 2 | 0.75 |
| 21 | -10 | 0 | 1 | 1 | 1 | 0.75 |
| 22 | 11 | 0 | 1 | 2 | 0 | 0.75 |
| 23 | -11 | 0 | 2 | 0 | 1 | 0.75 |
| 24 | 12 | 0 | 2 | 1 | 0 | 0.75 |
| 25 | -12 | 0 | 3 | 0 | 0 | 0.75 |
| 26 | 13 | 1 | 0 | 0 | 2 | 0.75 |
| 27 | -13 | 1 | 0 | 1 | 1 | 0.75 |
| 28 | 14 | 1 | 0 | 2 | 0 | 0.75 |
| 29 | -14 | 1 | 1 | 0 | 1 | 0.75 |
| 30 | 15 | 1 | 1 | 1 | 0 | 0.75 |
| 31 | -15 | 1 | 2 | 0 | 0 | 0.75 |
| 32 | 16 | 2 | 0 | 0 | 1 | 0.75 |
| 33 | -16 | 2 | 0 | 1 | 0 | 0.75 |
| 34 | 17 | 2 | 1 | 0 | 0 | 0.75 |
| 35 | -17 | 3 | 0 | 0 | 0 | 0.75 |
| 36 | 18 | 0 | 0 | 1 | 3 | 1 |
| 37 | -18 | 0 | 0 | 2 | 2 | 1 |
| 38 | 19 | 0 | 0 | 3 | 1 | 1 |
| 39 | -19 | 0 | 1 | 0 | 3 | 1 |
| 40 | 20 | 0 | 1 | 1 | 2 | 1 |
| 41 | -20 | 0 | 1 | 2 | 1 | 1 |
| 42 | 21 | 0 | 1 | 3 | 0 | 1 |
| 43 | -21 | 0 | 2 | 0 | 2 | 1 |
| 44 | 22 | 0 | 2 | 1 | 1 | 1 |
| 45 | -22 | 0 | 2 | 2 | 0 | 1 |
| 46 | 23 | 0 | 3 | 0 | 1 | 1 |
| 47 | -23 | 0 | 3 | 1 | 0 | 1 |
| 48 | 24 | 1 | 0 | 0 | 3 | 1 |
| 49 | -24 | 1 | 0 | 1 | 2 | 1 |
| 50 | 25 | 1 | 0 | 2 | 1 | 1 |
| 51 | -25 | 1 | 0 | 3 | 0 | 1 |
| 52 | 26 | 1 | 1 | 0 | 2 | 1 |

FIG. 18

CURRENT DISTRIBUTION OF OAC4 IN 1V PREDICTION

CURRENT DISTRIBUTION OF MVIEC4 IN 1V PREDICTION

CURRENT DISTRIBUTION OF (MVIEC4−OAC4) IN 1V PREDICTION

CURRENT DISTRIBUTION OF OAC4 IN 1H PREDICTION

CURRENT DISTRIBUTION OF MVIEC4 IN 1H PREDICTION

CURRENT DISTRIBUTION OF (MVIEC4−OAC4) IN 1H PREDICTION

FIG. 26

| CODE GR | INPUT RANGE | QUANTITY | CODE AVERAGE AMPLITUDE |
|---|---|---|---|
| 0 | 0 | 1 | 0 |
| 1 | +1~-1 | 2 | 0.5 |
| 2 | +2~+3 | 3 | 1 |
| 3 | -3~+5 | 4 | 1.5 |
| 4 | -5~-7 | 5 | 2 |
| 5 | +8~-10 | 6 | 2.5 |
| 6 | +11~+14 | 7 | 3 |
| 7 | -14~+18 | 8 | 3.5 |
| 8 | -18~-22 | 9 | 4 |
| 9 | +23~+27 | 10 | 4.5 |
| 10 | +28~+33 | 11 | 5 |
| 11 | -33~+39 | 12 | 5.5 |
| 12 | -39~-45 | 13 | 6 |
| 13 | +46~-52 | 14 | 6.5 |
| 14 | +53~+60 | 15 | 7 |
| 15 | -60~+68 | 16 | 7.5 |

FIG. 27

| CODE GR | INPUT RANGE | QUANTITY | CODE AVERAGE AMPLITUDE |
|---|---|---|---|
| 16 | −68～−75 | 15 | 8 |
| 17 | +76～+82 | 14 | 8.5 |
| 18 | +83～+89 | 13 | 9 |
| 19 | −89～+95 | 12 | 9.5 |
| 20 | −95～−100 | 11 | 10 |
| 21 | +101～+105 | 10 | 10.5 |
| 22 | +106～+110 | 9 | 11 |
| 23 | −110～−114 | 8 | 11.5 |
| 24 | −114～−117 | 7 | 12 |
| 25 | +118～+120 | 6 | 12.5 |
| 26 | +121～+123 | 5 | 13 |
| 27 | −123～+125 | 4 | 13.5 |
| 28 | −125～−126 | 3 | 14 |
| 29 | +127～−127 | 2 | 14.5 |
| 30 | +128(−128) | 1 | 15 |

GROUP 15

| Δ1 | Δ0 | AVERAGE AMPLITUDE |
|---|---|---|
| 0 | 15 | 7.5 |
| 1 | 14 | 7.5 |
| 2 | 13 | 7.5 |
| 3 | 12 | 7.5 |
| 4 | 11 | 7.5 |
| 5 | 10 | 7.5 |
| 6 | 9 | 7.5 |
| 7 | 8 | 7.5 |
| 8 | 7 | 7.5 |
| 9 | 6 | 7.5 |
| 10 | 5 | 7.5 |
| 11 | 4 | 7.5 |
| 12 | 3 | 7.5 |
| 13 | 2 | 7.5 |
| 14 | 1 | 7.5 |
| 15 | 0 | 7.5 |

FIG. 28

| DIFFERENCE ε | Δ1 | Δ0 | AVERAGE AMPLITUDE | PROBABILITY p (ε) |
|---|---|---|---|---|
| 0 | 0 | 0 | 0 | p(0) |
| 1 | 0 | 1 | 0.5 | p(1) |
| -1 | 1 | 0 | 0.5 | p(-1) |
| 2 | 0 | 2 | 1 | p(2) |
| -2 | 1 | 1 | 1 | p(-2) |
| 3 | 2 | 0 | 1 | p(3) |
| -3 | 0 | 3 | 1.5 | p(-3) |
| 4 | 1 | 2 | 1.5 | p(4) |
| ... | | | | |

F I G. 29

| id | num | Δ1 | Δ0 | ave of amp |
|---|---|---|---|---|
| 1 | 0 | 0 | 0 | 0 |
| 2 | 1 | 0 | 1 | 0.5 |
| 3 | −1 | 1 | 0 | 0.5 |
| 4 | 2 | 0 | 2 | 1 |
| 5 | −2 | 1 | 1 | 1 |
| 6 | 3 | 2 | 0 | 1 |
| 7 | −3 | 0 | 3 | 1.5 |
| 8 | 4 | 1 | 2 | 1.5 |
| 9 | −4 | 2 | 1 | 1.5 |
| 10 | 5 | 3 | 0 | 1.5 |
| 11 | −5 | 0 | 4 | 2 |
| 12 | 6 | 1 | 3 | 2 |
| 13 | −6 | 2 | 2 | 2 |
| 14 | 7 | 3 | 1 | 2 |
| 15 | −7 | 4 | 0 | 2 |
| 16 | 8 | 0 | 5 | 2.5 |
| 17 | −8 | 1 | 4 | 2.5 |
| 18 | 9 | 2 | 3 | 2.5 |
| 19 | −9 | 3 | 2 | 2.5 |
| 20 | 10 | 4 | 1 | 2.5 |
| 21 | −10 | 5 | 0 | 2.5 |
| 22 | 11 | 0 | 6 | 3 |
| 23 | −11 | 1 | 5 | 3 |
| 24 | 12 | 2 | 4 | 3 |
| 25 | −12 | 3 | 3 | 3 |
| 26 | 13 | 4 | 2 | 3 |
| 27 | −13 | 5 | 1 | 3 |
| 28 | 14 | 6 | 0 | 3 |
| 29 | −14 | 0 | 7 | 3.5 |
| 30 | 15 | 1 | 6 | 3.5 |
| 31 | −15 | 2 | 5 | 3.5 |
| 32 | 16 | 3 | 4 | 3.5 |
| 33 | −16 | 4 | 3 | 3.5 |
| 34 | 17 | 5 | 2 | 3.5 |
| 35 | −17 | 6 | 1 | 3.5 |
| 36 | 18 | 7 | 0 | 3.5 |
| 37 | −18 | 0 | 8 | 4 |
| 38 | 19 | 1 | 7 | 4 |
| 39 | −19 | 2 | 6 | 4 |
| 40 | 20 | 3 | 5 | 4 |
| 41 | −20 | 4 | 4 | 4 |
| 42 | 21 | 5 | 3 | 4 |
| 43 | −21 | 6 | 2 | 4 |
| 44 | 22 | 7 | 1 | 4 |
| 45 | −22 | 8 | 0 | 4 |
| 46 | 23 | 0 | 9 | 4.5 |
| 47 | −23 | 1 | 8 | 4.5 |
| 48 | 24 | 2 | 7 | 4.5 |
| 49 | −24 | 3 | 6 | 4.5 |
| 50 | 25 | 4 | 5 | 4.5 |
| 51 | −25 | 5 | 4 | 4.5 |
| 52 | 26 | 6 | 3 | 4.5 |

FIG. 30

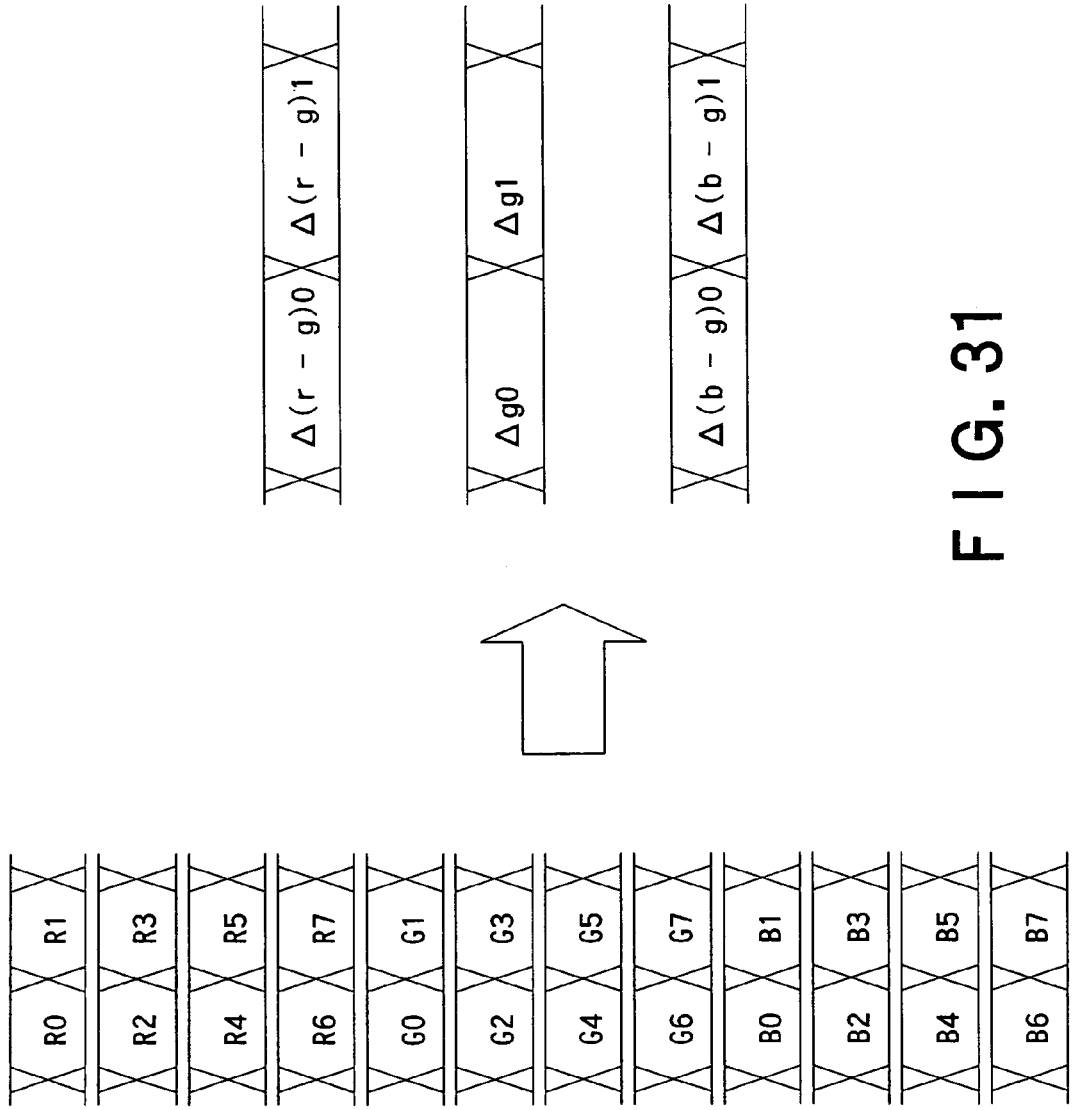
F I G. 31

IMAGE TRANSMITTING APPARATUS, IMAGE RECEIVING APPARATUS, AND IMAGE TRANSMISSION SYSTEM

CROSS REFERENCE TO RELATED APPLICATIONS

This application is based upon and claims the benefit of priority from the prior Japanese Patent Application No. 2005-73812, filed on Mar. 15, 2005, the entire contents of which are incorporated herein by reference.

BACKGROUND OF THE INVENTION

1. Field of the Invention

The present invention relates to an image transmitting apparatus, an image receiving apparatus, and an image transmission system which transmit or receive image data.

2. Related Art

In order to deal with high resolution and high quality image data, it is necessary to transmit massive image data. This massive data transfer in recent year causes an EMI problem.

Many data transmission techniques are proposed to cope with EMI, such as RSDS (Reduced Swing Differential Signaling), mini-LVDS (Low Voltage Differential Signaling), CMADS (Current Mode Advanced Differential Signaling), whisper BUS, Mobile-CMADS, MSDL (Mobile Shrink Data Link), MPL (Mobile Pixel Link), and MVL (Mobile Video Interface). Some papers are reported in the Society for Information Display: A Lee's paper concerning RSDS (refer to "Integrated TFT-LCD Timing Controllers with RSDS Column Driver Interface, SID Digest 6.2, 1999"), a Yusa's paper concerning CMADA (refer to "High-Speed I/F for TFT-LCD Source Driver IC by CMADS, SID Digest 9.4, 2001"), and a McCartney's paper (refer to "Whisper BUS: An Advanced Interconnect Link For TFT Column Driver Data, SID Digest.9.3, 2001"). In addition, a comparative article has collectively discussed on introductions of serial interfaces for cellular phone (refer to "A revolver type promotes a serial interface. The wire count is reduced to 1/10 or less". Nikkei electronics, No. 3.15 in 2004, pp. 128-130").

Furthermore, cellular phones have several extensions of the serial interfaces: Mobile-CMADS, MSDL, MPL, and MVI. In the extensions, circuit improvements successfully (but fortunately) suppressed EMI since the amount of pixels is still small at the present time. However, these are temporary remedy. As the amount of pixels will increase further from now on, the size of data will rapidly increase too. This rapid increase implies that the circuit is requested to operate at higher frequency, and cost of the circuit is becoming more intolerant. Therefore, the improvements of circuit will reach critical limit in the near future.

Power consumption is an important factor in electronic devices especially in the case that device is power-supplied by a battery in cellular phones. In addition, higher speed operation of circuits is not desirable. Hence, we need another new technology, but the technology should be consistent with the conventional technology. This means that solutions to be investigated should be "add-on approach" based on the conventional circuit-related improvements. Considering this strategy, compression of data size and reduction of data transition will be cited as conventional technology relating to the present invention. These will be explained below.

Japanese Patent Laid-Open No. 2003-366107 includes the transition reducing technology such as an alternative bit inversion method, and the size reducing technologies such as a Huffman coding, an one-dimensional compressing method, and an arithmetic compression method. This official gazette reported that size of data reduction is not always attained to ½, and its data size changes heavily depending on data itself. This dependency requests an adjustment of transmission frequency according to data size in order to transfer data without loss. An extra control circuit is not desirable in order to implement the adjustment.

In addition, Japanese Patent Laid-Open No. 2002-202760 includes a technology, which reduces data transition using popular bus inversion technique: when majority of data changes, original data is intentionally bit-inverted to reduce data transition. These official gazettes treat data as a "general number" to be transferred in a bus. A property of image data is not utilized well. For this reason, compression ratio is not so high.

Japanese Patent Laid-Open No. 2000-152129 includes a technology of utilizing addition and subtraction to reduce data transition. In this official gazette, a numerical conversion reduces transition count: for example, an operation "add one" is such a conversion. This conversion transforms a transition "0000 to 1111" to a transition "0001 to 0000", which reduces transition count (4 transitions to 1 transition). Since this official gazette also treats "general data", not specialized for image data, image data cannot be processed effectively from the aspect of utilization of statistical property of image.

In addition, an FV coding method is known, which performs bus inversion with dynamic monitoring of data frequency (refer to "Jun Yang, Rajiv Gupta, FV Encoding for low-power Data I/O, IEEE, and ISLPED 2001). This method also does not intentionally utilize the statistical property of image as data.

Now, survey will proceed to the technologies to utilize statistical property of image. Japanese Patent Laid-Open No. 2003-44017 includes a method to reduce size of data to be transferred. When a current data has same value as a 1H-previous data, the re-usage of saved 1H-previous data don not request the transfer of current data. This non-transmission works equivalently as a reduction of data size. However, since a probability in an actual image to have same value as 1H-previous is ten to twenty percent on average, the above non-transmission attains at most twenty percent reduction. Hence, it is impossible to obtain so large enough effect that EMI noise is fully reduced.

In addition, a VDE method is proposed, which reduces EMI noise using "1H" correlation of an image (refer to Japanese Patent Laid-Open No. 2000-20031, U.S. Pat. No. 6,344, 850, and a paper of "Haruhiko Okumura et al., Vertically Differential EMI Compression Method for High Resolution LCDs, SID I DRC 2003"). In these reports, "1H" prediction, "1V" prediction, and a spatial predictor are so simple that its resultant performance is insufficient. In addition, the VDE method simply transfers differential data as it is, and the VDE method has no channel coding to reduce a transition count on a channel. For this reason, good performance can be achieved only when correlation is extremely high like a PC screen artificially generated. Hence, its performance is not good for natural images such as a TV screen.

ISO standard FCD14495 is a popular technology known as JPEG-LS (lossless) at the present time. JPEG-LS is one of most advanced data compression technology without data loss (lossless). The JPEG-LS technology uses DPCM (Differential Pulse Code Modulation). MED (Median edge detector) and GAP (gradient-adjusted predictor) are well known as DPCM technology related to image data. As GAP needs 2H memory (memory for two horizontal lines) and hardware circuit size is large, MED is discussed to use as DPCM hereinafter because MED needs only 1H memory. But, prioritizing of area-efficient implementation may select another choice if necessary, because the other predictor with rather inferior performance may have smaller hardware.

MED has been further improved in recent years. There is a modified MED technology to improve performance with diagonal edges (refer to a paper of "Jiang et al., Revisiting the JPEG-LS prediction scheme, IEE Proc. Visual Image Signal Process, Vol. 147, No. 6, December 2000, pp. 575-580).

In addition, there is another modified MED technology to improve performance with different prediction formula (refer to papers of "Grecos et al., Two Low Cost Algorithms for Improved Diagonal Edge Detection in JPEG-LS, IEEE Transaction on Consumer Electronics, Vol. 47, No. 3, August 2001, pp. 466-473", and "Jiang et al., "Toward improved prediction accuracy in JPEG-LS", SPIE Optical Engineering, 41(2) 335-341 (February 2002)"). Yet another modified MED with higher performance is proposed (refer to a paper of "Edirisinghe, Improvements to JPEG-LS via diagonal edge based prediction, Visual Communications and Image Processing 2002, Proceedings of SPIE, Vol. 4671 (2002)". All these conventional MEDs are used for the purpose of data compression. They are not used for the different purposes: reduction of EMI noise and reduction of wiring count.

Next, conventional technologies to utilize image entropy will be explained to quickly survey related technologies, because they are generally helpful to understand the present invention. Several data compression technologies are known, which utilize entropy in order to reduce size of encoded codes. These include technologies such as Golomb codes, arithmetic coding, and Huffman coding, (David Salomon, Data Compression, 3rd Edition, 2004, Springer-Verlag).

In recent years, there are other two technical directions. One is an idea of reducing a transition count in data. Another is an idea of reducing amplitude of signal. First, a survey will be started from technology of transition count reduction. There are three technologies concerning EMI improvement for DVI (Digital Visual Interface, DVI Revision 1.0, Apr. 02, 1999, Digital Display Working Group, http: //www.d-dwg.org). A first is "Chromatic encoding" technology by Cheng et al. (We-Chung Cheng and Massound Pedram, Chromatic Encoding: a Low Power Encoding Technique for Digital Visual Interface, IEEE DATE 2003 session 6.3) (technology added to U.S. Pat. No. 5,974,464). A second is "Differential Bar Encoding" technology by Bocca et al. (Alberto Bocca, Sabino Salerno, Enrico Macii, and Massimo Poncino, Energy-Efficient Bus Encoding for LCD Displays, GLSVLSI'04). A last is "Limited Intra-Word Transition Codes" (Sabino Salerno, Alberto Bocca, Enrico Macii, and Massimo Poncino, Limited Intra-Word Transition Codes: An Energy-Efficient Bus Encoding for LCD Display Interfaces, IEEE/ACM ISLPED 2004, session 7.4). As shown above, three variations to reduce transition count are already known.

On the other hand, there is a multi-value image entropy coding (MVIEC) as technology of using entropy to deduce amplitude (U.S. Pat. No. 6,633,243: Hisashi Sasaki, Tooru Arai, Masayuki Hachiuma, Akira Masuko, and Takashi Taguchi, Multi-Valued Image Entropy Coding for Input-Width Reduction of LCD Source Drivers, SID Asia Dispiay/IMID 2004).

However, considering further increase in the amount of pixels, the conventional multi-value image entropy coding cannot fully reduce signal amplitude yet. Hence, further reduction of power consumption is requested.

SUMMARY OF THE INVENTION

According to one embodiment of the present invention, an image transmitter, comprising:

a color difference differential calculating unit configured to calculate color difference differential data relating to a difference between a current predicting value predicted based on previous image data and current actual image data;

a multi-valued generator configured to generate multi-valued data corresponding to the color difference differential data based on the color difference differential data, statistical properties of the image data and a signal amplitude of the multi-valued data to be generated; and a transmitter configured to transmit the multi-valued data through at least one transmission line.

Furthermore, according to one embodiment of the present invention, an image receiver, comprising:

a receiver configured to receive multi-valued data generated based on color difference differential data relating to a difference between a current predicting value predicted by a previous image data and current actual image data, statistical properties of the image data, and a signal amplitude of the multi-valued data to be generated, through at least one transmission line;

a decoder configured to decode the received multi-valued data to generate the color difference differential data relating to a difference between color difference data corresponding the current actual image data and color difference data predicted by the previous image data; and an image restoring unit configured to restore the current actual image data based on the color difference differential data.

Furthermore, according to one embodiment of the present invention, an image transmission system, comprising:

an image transmitter configured to transmit image data; and an image receiver configured to receive the image data, wherein the image transmitter includes:

a color difference differential calculating unit configured to calculate color difference differential data relating to a difference between a current predicting value predicted based on previous image data and current actual image data;

a multi-valued generator configured to generate multi-valued data corresponding to the color difference differential data based on the color difference differential data, statistical properties of the image data and a signal amplitude of the multi-valued data to be generated; and a transmitter configured to transmit the multi-valued data through at least one transmission line, and wherein the image receiver includes:

a receiver configured to receive the multi-valued data transmitted via the transmission line;

a decoder configured to decode the received multi-valued data to generate the color difference differential data relating to a difference between color difference data corresponding the current actual image data and color difference data corresponding to a current predicting value predicted by the previous image data; and an image restoring unit configured to restore the current actual image data based on the color difference differential data.

BRIEF DESCRIPTION OF THE DRAWINGS

FIG. 2 is a block diagram showing an example of internal configuration of a timing controller 2 and source driver 5;

FIG. 3 is a list showing an example of correspondence between modulo reduced data and channel code;

FIG. 4 is a list showing values of respective components and average amplitude of the channel code in a group 0;

FIG. 5 is a list showing values of respective components and average amplitude of the channel code in a group 1;

FIG. 6 is a list showing values of respective components and average amplitude of the channel code in a group 2;

FIG. 7 is a list showing values of respective components and average amplitude of the channel code in a group 3;

FIG. 8 is a list showing values of respective components and average amplitude of the channel code in a group 4;

FIG. 9 is a list showing values of respective components and average amplitude of the channel code in a group 5;

Figure 10:
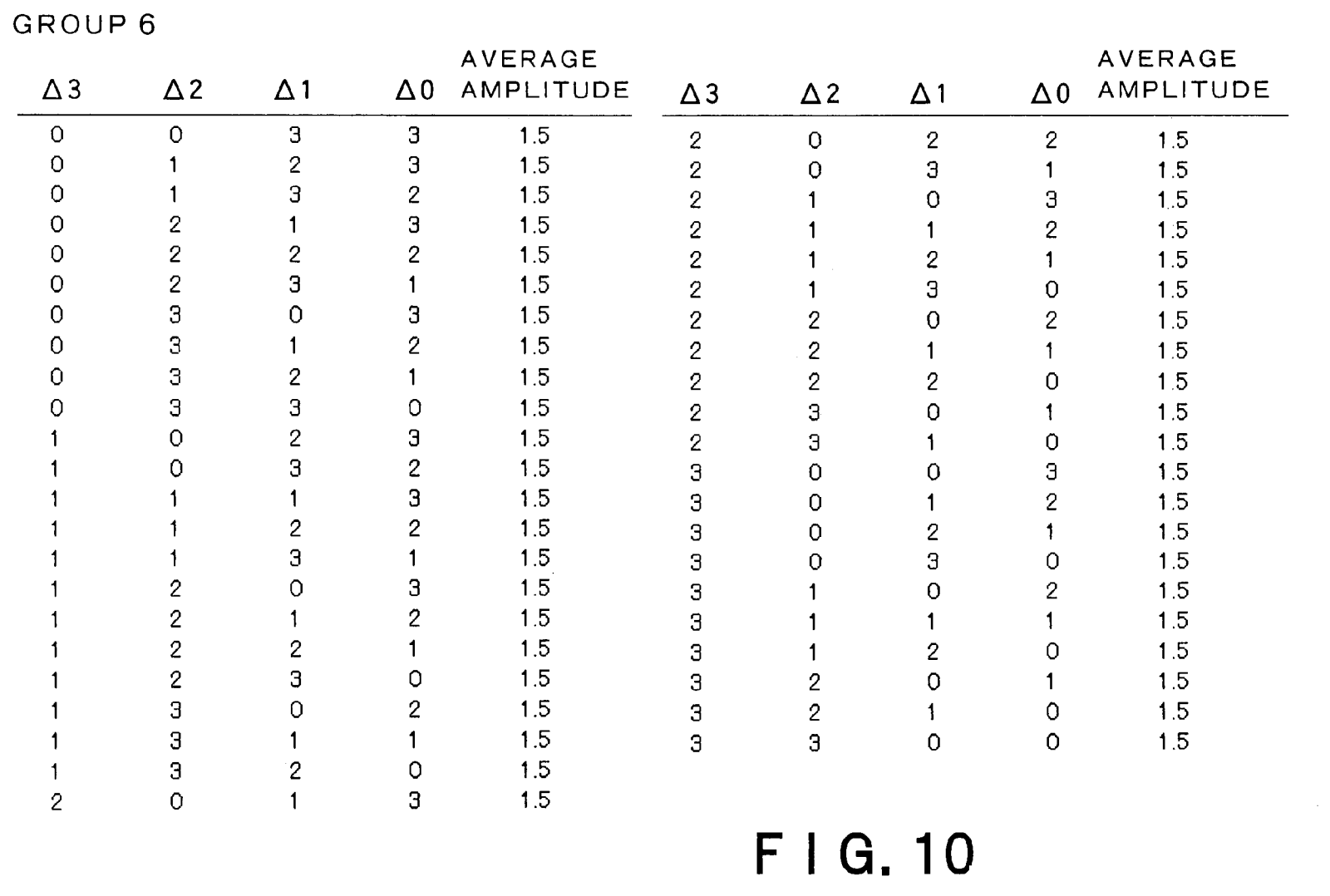

FIG. 10 is a list showing values of respective components and average amplitude of the channel code in a group 6;

FIG. 11 is a list showing values of respective components and average amplitude of the channel code in a group 7;

FIG. 12 is a list showing values of respective components and average amplitude of the channel code in a group 8;

FIG. 13 is a list showing values of respective components and average amplitude of the channel code in a group 9;

FIG. 14 is a list showing values of respective components and average amplitude of the channel code in a group 10;

FIG. 15 is a list showing values of respective components and average amplitude of the channel code in a group 11;

FIG. 16 is a list showing values of respective components and average amplitude of the channel code in a group 12;

FIG. 17 is a list showing correspondence among the modulo reduced data, channel code, average amplitude of the channel code, and the occurrence probability;

FIG. 18 is a list showing an example of correspondence between the modulo reduced data and channel code which are obtained finally;

FIG. 26 is a list showing an example of correspondence between the modulo reduced data and channel code at the time of generating 16-valued channel code;

FIG. 27 is a list following FIG. 26;

FIG. 28 is a list showing values of respective components and average amplitude of the channel code in a group 15;

FIG. 29 is a list showing correspondence among the modulo reduced data, channel code, average amplitude of the channel code, and the occurrence probability;

FIG. 30 is a list showing an example of correspondence between the modulo reduced data and channel code which are obtained finally; and FIG. 31 is a diagram showing an example of transmission timing of the channel code supplied to transmission lines 3 from the timing controller 2.

DETAILED DESCRIPTION OF THE INVENTION

Hereafter, an embodiment of the present invention will be explained with reference to drawings.

First Embodiment

Figure 1:
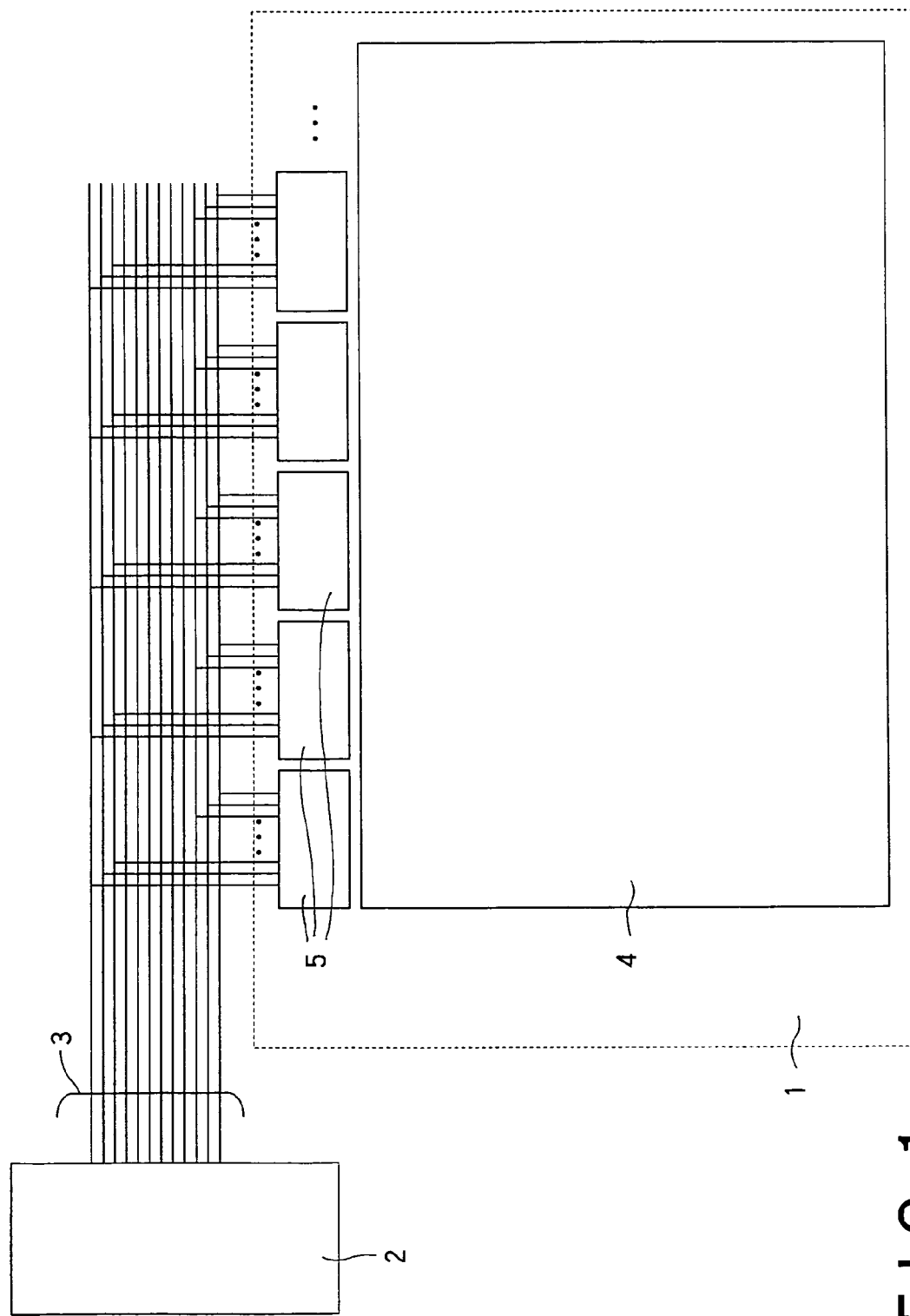
FIG. 1 is a block diagram showing schematic configuration of an image transmission system according to one embodiment of the present invention.

FIG. 1 is a block diagram showing schematic configuration of an image transmission system according to an embodiment of the present invention. The image transmission system in FIG. 1 is equipped with a liquid crystal panel 1, and a timing controller 2 which performs display control of the liquid crystal panel 1. The liquid crystal panel i and the timing controller 2 are connected to a plurality of transmission lines 3 formed on an FPC (Flexible Print Circuit).

The liquid crystal panel 1 has a liquid crystal display part 4 formed on a glass substrate, and a plurality of source drivers 5 implemented near a frame of the glass substrate. The liquid crystal display part 4 has signal lines and scanning lines arranged in vertical and horizontal directions, and pixel TFTs (Thin Film Transistors) formed near respective intersections of the signal lines and the scanning lines, which are omitted in FIG. 1.

The timing controller 2 is embedded in a host computer not shown, and it supplies image data, which should be displayed, on the transmission lines 3.

This embodiment has a feature in internal configuration of the timing controller 2 and source driver 5, and aims at reduction of the count of the transmission lines 3, EMI noise, and average currents on the transmission lines 3 by transmitting the multi-valued image data FIG. 2 is a block diagram showing an example of the internal configuration of the timing controller 2 and source driver 5. The timing controller 2 has a predictor 11, a color difference differential calculator 12, a modulo reduction part 13, and a channel encoder 14. The source driver 5 has a channel decoder 21, a predictor 22, and a color difference decoder 23.

The predictor 11 predicts image data in a current scanning position from adjacent image data. Generally, DPCM (Differential Pulse Code Modulation) calculates a difference between prediction image data (color difference image data predicted) and actual image data (actual color difference image data), and the difference is transmitted as "color difference differential data". The term of double differentiation denotes the fact that there are two types of difference: prediction difference and color difference, so it means a predictor difference of color difference. This embodiment calculates data difference within the framework of this DPCM, and transfers the difference.

Specific configuration of the predictors 11 and 22 is irrelevant. There are various algorithms such as MED and GAP for the predictors 11 and 22. Any algorithm is available for our purpose. The selection depends on a trade-off among performance factors such as cost of hardware to be implemented, and EMI performance at data transfer. Hereinafter, a simplest "1V" difference will be supposed as our art for the sake of explanation's simplicity.

The "1V" difference is a method of taking a difference between current pixel data and 1V previous pixel data, where "1V previous" means that it was scanned before the current pixel data is scanning (since it is located upper by one vertical line, it is called "1V" previous). The explanation based on "1V" will be given because the "1V" prediction has smallest hardware size, although MED may be more desirable by its high-performance as entropy coding. Considering from the theoretical aspect of prediction, differentiation is interpreted as prediction of current value with 1V previous value. The color difference differential calculator 12 performs processing to calculate this difference.

In the case of "1V" difference, the predictors 11 and 22 simply hold the "1V" previous data, and perform the operation to refer to it. In practice, the color difference differential data are "$\epsilon(R-G)$", "$\epsilon G$", and "$\epsilon(B-G)$". Hereinafter, "G" will be firstly explained, and other color difference data "(R-G)" and "(B-G)" will have same explanations while their explanations are omitted.

Since color difference differential data is generated as a difference, its bit width is increased by one bit compared to color difference data, where its bit width is independently determined from prediction methods. For example, suppose that image data "G" is 8 bit wide and its prediction image data "G'" is also 8 bit wide. Naturally, a range of a value predicted is always same as a range of original data. Hence, a difference between prediction image data and actual image data (color difference differential data) $\epsilon G = G - G'$ is 9 bit wide with including plus minus sign.

For example, when a value of the prediction image data "G'" is 255 and a value of the actual image data "G" is 0, the color difference differential data "$\epsilon G$" is -255. Similarly, when a value of the prediction image data "G'" is 0 and a value of the actual image data "G" is 255, the color difference differential data "$\epsilon G$" is 255. Note that actual image data is rarely far from predicted value, because it is merely a prediction anyway. However, based on experiments, the prediction is so certain that an error distribution has a very sharp single peak around 0. This discussion has reconfirmed that color difference differential data "$\epsilon G$" is 9 bit-wide to differentiate.

The modulo reduction part 13 in FIG. 2 converts 9-bit differential data into 8-bit differential data by modulo reduction. In this part, reduction of bit width still keeps completeness of data in spite of loss of 1 bit, so that 9-bit differential data is completely reconstructed at decoding stage. Note that modulo reduction part 13 is not necessarily indispensable. Modulo reduction is desirable by the advantages that the bit width is reduced without losing any information, and that the size of the channel encoder 14 is decreased. So, the embodiment is applicable even if the modulo reduction part is omitted.

The channel encoder 14 converts data given by modulo reduction (hereafter, modulo reduced data) into channel code (multi-value data) to achieve EMI reduction, and transfers it to the transmission lines 3. When without modulo reduction, the channel encoder 14 generates multi-value data directly from color difference differential data.

The channel decoder 21 in the source driver 5 decodes the multi-value data into modulo reduced data. The predictor 22 performs the identical processing as the predictor 11, and regenerates predicted image data. The color difference decoder 17 restores the original image data based on modulo reduced data and predicted image data.

Next, a coding principle in this embodiment will be explained. In Japanese Patent Application No. 2004-100545 which the present inventor applied previously, color difference differential data was coded, and thereafter, was converted into channel code (multi-value data). The channel coding required two steps: a step of coding and a step of conversion into channel code.

On the other hand, this embodiment directly (by a single step) generates channel code from color difference differential data. Thereby, a proposing new channel both reduces code average currents further and suppresses EMI noise radiation, where the channel code is different from the code described in the above-mentioned prior coding. The proposed code configuration is suitable to reduce average current by configuring the channel code more directly in concept. In addition, simplification of hardware is easy to perform.

Hereafter, "Δ" denotes channel code directly generated from color difference differential data.

In the above-mentioned prior specification, coded data generated from color difference differential data has only "0" and "1" as its potential value. On the other hand, in this embodiment, when the channel code is 16-valued, it potentially has 16 kinds of values from 0 to 15. When 4-valued (it is popularly called "quaternary", however, "4-valued" is used to give consistent notation as multi-valued technology), it potentially has four kinds of values from 0 to 3.

In this embodiment, signal amplitude of the channel code is wanted to be small as possible to reduce consumption current. That is, smaller signal amplitude is more desirable. In order to satisfy the desire, this art proposes a new assignment from color difference differential data to channel code by the following procedure: arrange a color difference differential data in the order of high occurrence probability first (that is, smaller absolute value first) and arrange the channel code with small signal amplitude first. This principle is called here "First higher (of occurrence probability), First lower (of amplitude)."

FIG. 3 is a list showing an example of correspondence between the modulo reduced data and channel code. The modulo reduced data is classified into a plurality of groups according to signal amplitude of each data. FIG. 3 shows an example of converting the modulo reduced data into the 4-valued channel code, and the modulo reduced data is classified into 13 groups.

FIG. 3 shows correspondence among the four items: "Code GR", "Input Range", "Quantity" and "Code average amplitude", where "Code GR" shows a serial number for identifying each group, "Input range" shows a range of corresponding modulo reduced data, "Quantity" shows the count of data belonging to each group, "Code average amplitude" shows average amplitude of the channel code in each group.

In FIG. 3, a group whose average amplitude of the code is zero is classified into a group 0, and a group whose average amplitude is 0.25 is classified into a group 1. Since average amplitude is the same in the same group, 13 groups have different average amplitudes, respectively.

The modulo reduced data is assigned for each group in ascending order of an absolute value, such as 0, +1, -1, +2, -2 . . . An absolute value of the modulo reduced data runs up to "128."

Let each color of RGB be 256-gradation image data. Suppose the case that modulo reduced data is converted into a 4-valued channel code. In this case, the channel code needs four components. Hereafter, (Δ3, Δ2, Δ1, Δ0) will denote the four components constituting the channel code.

FIGS. 4 to 16 are lists showing values of respective components and average amplitude of the channel code in groups 0 to 12. For example, FIG. 4 shows the group 0. The group 0 has a single channel code is assigned as (0, 0, 0, 0), and its average amplitude is (0+0+0+0)/4=0.

As shown in FIG. 5, the group 1 has four channel codes (0001, 0010, 0100, 1000). Average amplitude of these four channel codes is (1+0*3)/4=0.25. In this way, channel codes with the same average amplitude belong to the same group.

FIG. 17 is a list showing correspondence among the modulo reduced data, channel code, average amplitude of the channel code, and the occurrence probability. Since the modulo reduced data $\epsilon$=0 has the highest occurrence probability p(0), the channel code (0000) in the group 0 with the smallest amplitude is assigned for the data $\epsilon$=0. Next, four of modulo reduced data $\epsilon$=+1, $\epsilon$=−1, $\epsilon$=+2, and $\epsilon$=−2 are assigned for four channel codes found in the group 1.

Since each of these four channel codes has the same average amplitude, assignment order is arbitrary. Here, the order of 0001, 0010, 0100, and 1000 is candidate assignment for $\epsilon$=+1, $\epsilon$=−1, $\epsilon$=+2, and $\epsilon$=−2, respectively.

Next, with using the group 2, ten codes are assigned to the modulo reduced data $\epsilon$ from +3 to −7. Hereafter, assignments are repeated similarly up to the modulo reduced data of +128 (=−128). Note that +128 is dealt with as the same value as −128 as modulo reduction.

FIG. 18 is a list showing an final result of correspondence between the modulo reduced data and channel code. In FIG. 18, the channel code and average amplitude are partially shown with respect the modulo reduced data. As shown in the list in this embodiment, the channel code is obtained by ordering assignments according to the average amplitude, and hence, it is named "ordered amplitude code (OAC)". A term "OAC4" denotes the case of four values, and "OAC16" the case of 16 values.

A first leftmost column "id" of FIG. 18 includes a serial number for identifying each of the modulo reduced data, which runs 1 to 256. In FIG. 18, "id" shows partially the data of 1 to 52. A second column "num" shows values of the modulo reduced data $\epsilon$, its associated absolute value is increasing by one with starting from 0 to 1, −1 . . . and with alternating a sign in turn. This means the modulo reduced data is arranged in descending order of occurrence probability. Third to sixth columns ($\Delta 3$, $\Delta 2$, $\Delta 1$, $\Delta 0$) show respective components of the 4-valued channel code. A last rightmost column "sum of amp" shows average amplitude of the channel code. Here, since component count is always 4, a sum of the four amplitudes is interpreted as a substitute for the average value.

The order of the channel code may be reordered suitably although the channel code was arranged in the order of values for modulo reduced data in FIG. 18. Since the reordering within the same group has no side effect of degrading performance towards larger amplitude, some cases have no serious problem even if the order is reordered.

In addition, an average current does not so much increase because of low occurrence probabilities when straddling lower groups: when the order of modulo reduced data is reordered across lower groups. For this reason, reordering is advantageous in some cases that hardware is significantly simplified by the reordering even if average currents increase somewhat.

Such optimization of hardware is available by performing logic synthesis from a description in VHDL or Verilog. Alternatively, optimization using PLA, ROM, or the like is available. In addition, since a first half of 32 codes covers almost portions of the higher occurrence probability (totally, 95%), large performance degradation is not caused by an assignment, for example, the combination of two partial assignments: the assignment for the groups 1-3 according to FIG. 18 and an assignment given by arbitrary reordering for the rest part.

In this way, FIG. 18 is merely an example: it is possible to perform arbitrary reordering. Conversely speaking, in multi-valuation assignment, it is desirable to prioritize upper groups such as the group 1 and group 2, and to reorder other groups to be consistent with reordering in the prioritized upper groups.

The above processing is performed for three kinds of modulo reduced data, "$\Delta$(r-g)", "$\Delta$g", and "$\Delta$(b-g)", respectively.

Figure 19:
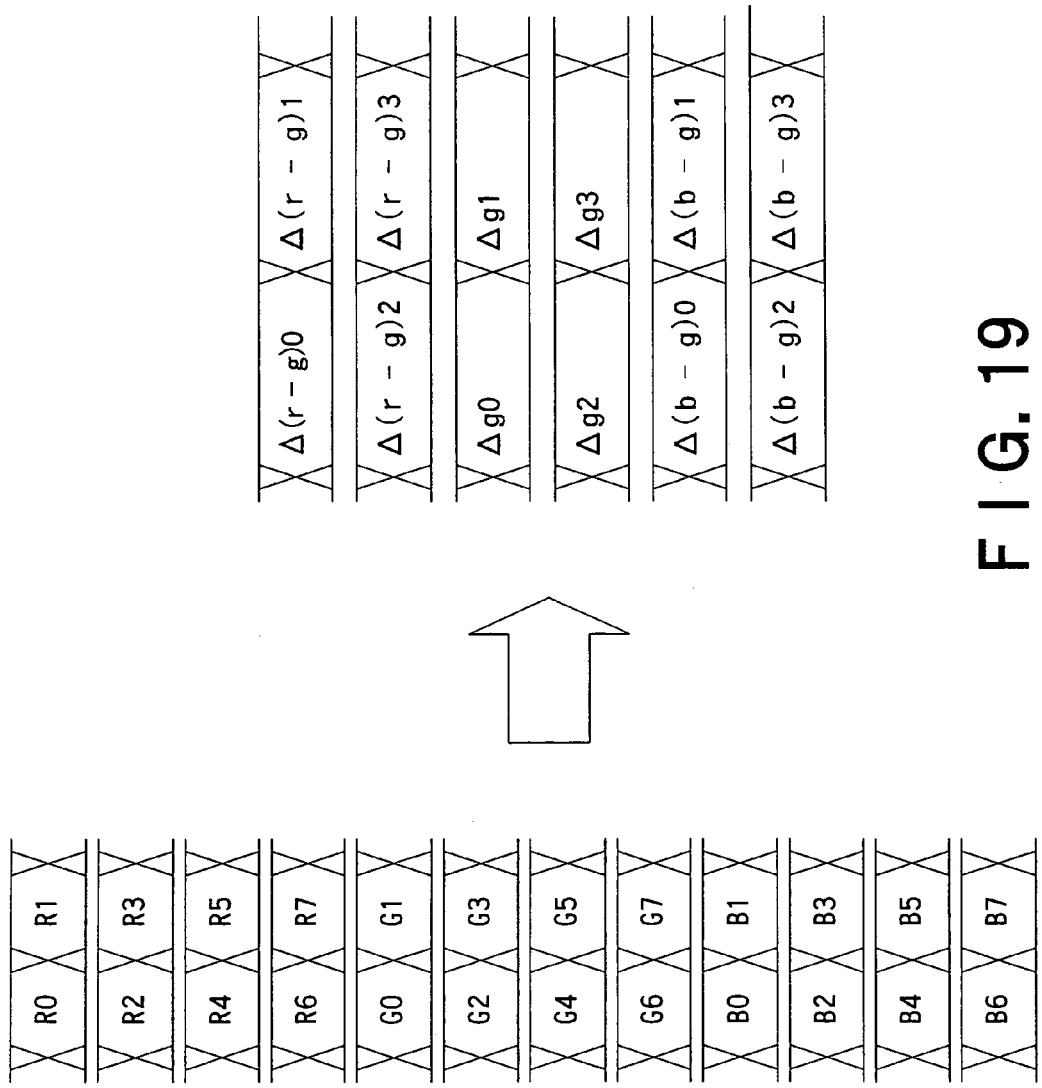
FIG. 19 is a diagram showing an example of transmission timing of the channel code supplied to transmission lines 3 from the timing controller 2.

FIG. 19 is a diagram showing an example of transmission timing of the channel code that is supplied to the transmission lines 3 from the timing controller 2. A left side of FIG. 19 shows conventional transmission timing, and a right side shows transmission timing of this embodiment. FIG. 19 shows an example of transmitting the 4-valued channel code.

As shown in FIG. 19, three kinds of channel codes corresponding to three kinds of modulo reduced data are transmitted through two transmission lines 3, respectively. Thereby, the channel code is transmitted through the transmission lines 3 whose wiring count is a half of the conventional example.

FIG. 19 shows an example and the transmission order of channel codes can be modified suitably. FIG. 19 shows the example of transmitting one pixel per two cycles. The count of cycles to transmit one pixel may be modified suitably.

FIGS. 20 to 25 show analysis results for "OAC4". It is known that color difference differential data $\epsilon$ is statistically approximated by Laplace distribution. However, concerning an individual image, it is not always strictly approximated by Laplace distribution. In addition, its distribution parameters also varies by image itself. So, each analysis was conducted for 75 TV images here, and their results are statistical.

Figure 20:
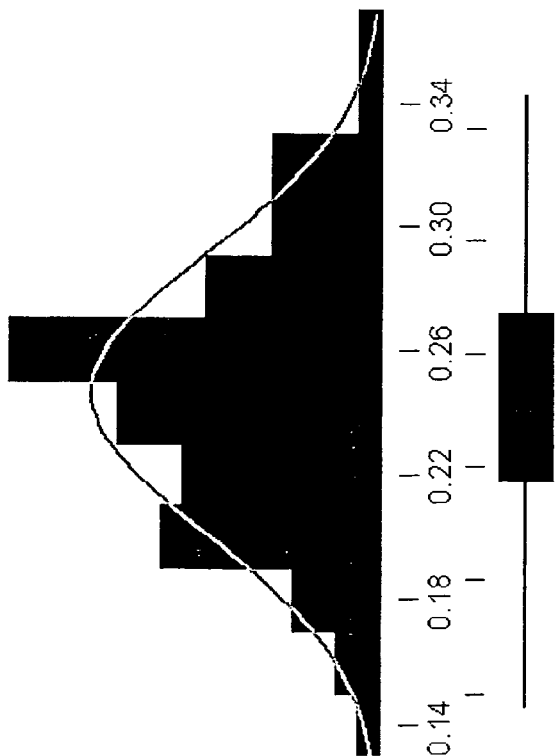
FIG. 20 is a graph showing the average current distribution of "OAC4" using "1V" prediction.
Figure 21:
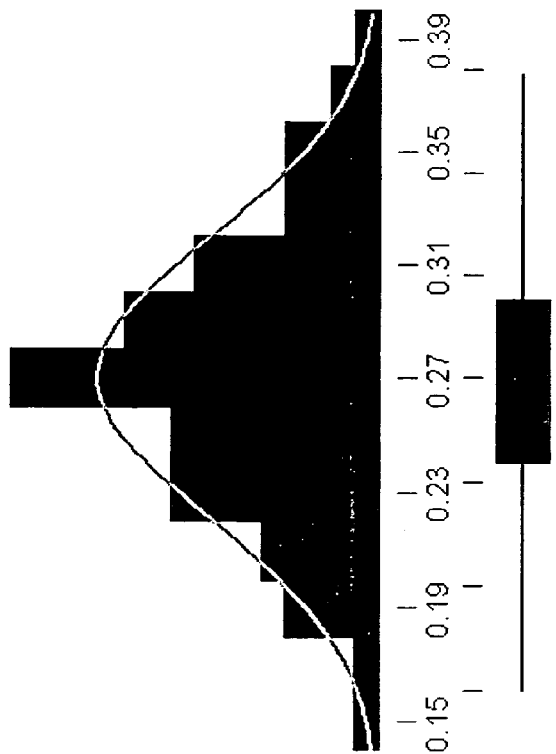
FIG. 21 is a graph showing the average current distribution of conventional coding "MVIEC4" using "1v" prediction.
Figure 22:
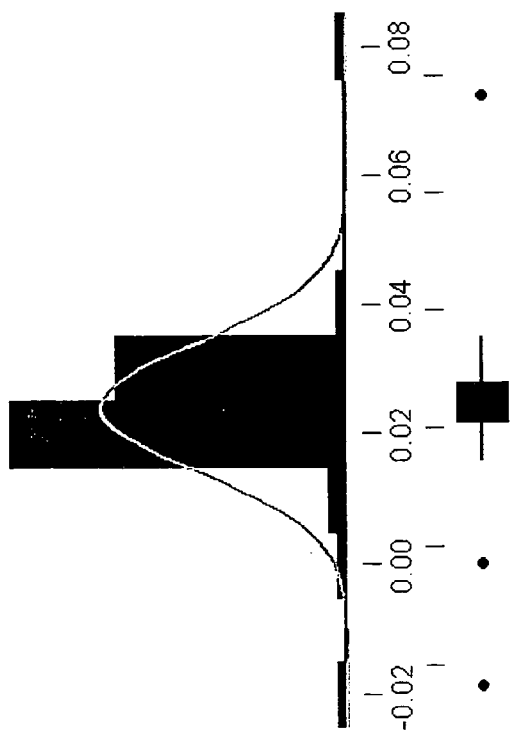
FIG. 22 is a graph showing the average current distribution of "MVIEC4-OAC4" using "1V" prediction.

FIG. 20 is a graph showing a average current distribution of "OAC4" using "1V" prediction as the predictor 11. FIG. 21 is a graph showing a average current distribution of conventional coding "MVIEC4" using "1V" prediction. FIG. 22 shows a distribution of their difference of average currents, i.e., a distribution of "MVIEC4-OAC4". FIG. 22 suggests that "OAC4" is smaller than "MVIEC4" because its average is positive. This means that the conventional "MVIEC" is improved by the "OAC" coding. Its improvement is 0.27 to 0.24, that is, about ten percent.

Figure 23:
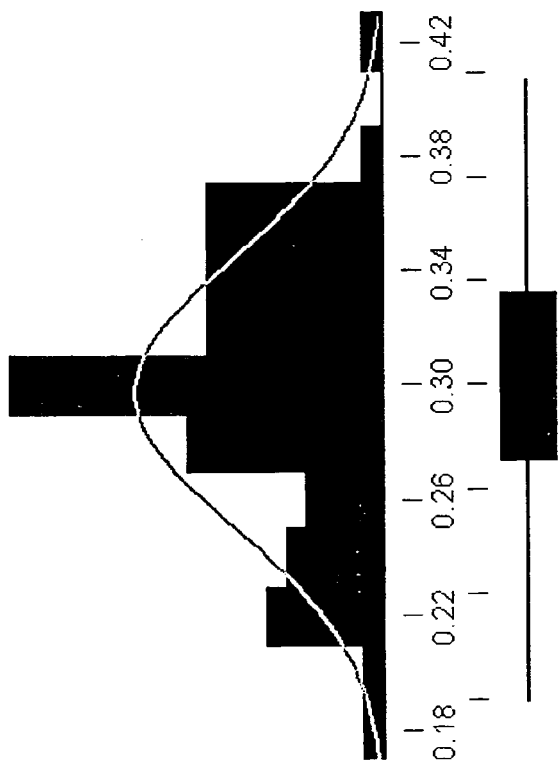
FIG. 23 is a graph showing the average current distribution of "OAC4" using "1H" prediction.
Figure 23:
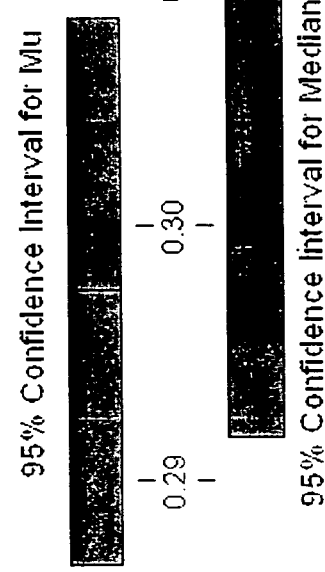
Figure 24:
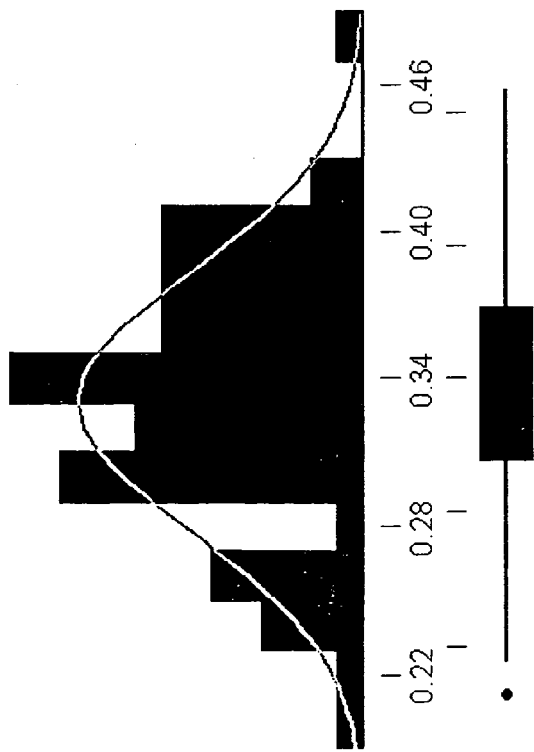
FIG. 24 is a graph showing the average current distribution of conventional coding "MVIEC4" using "1H" prediction.
Figure 25:
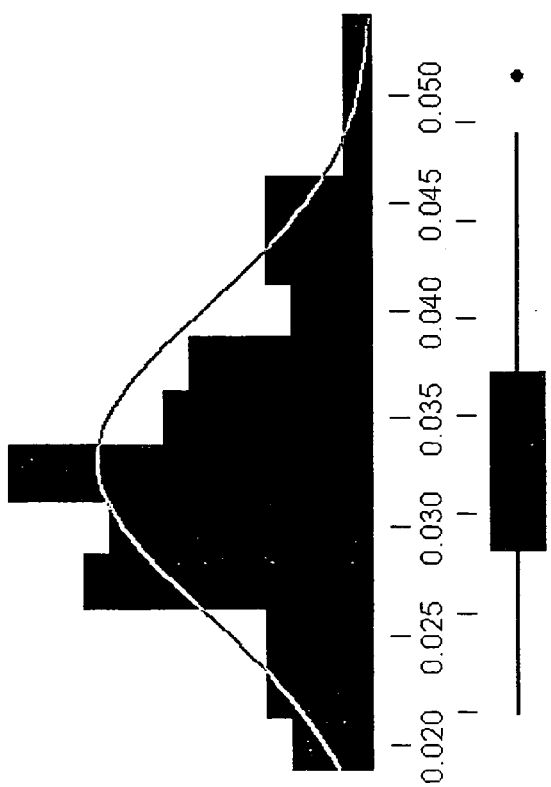
FIG. 25 is a graph showing the average current distribution of "MVIEC4-OAC4" using "1H" prediction.

FIGS. 23, 24, and 25 show analysis results when replacing the predictor 11 "1V" to "1H". FIG. 23 shows "OAC4", FIG. 24 shows "MVIEC4", and FIG. 25 shows "MVIEC4-OAC4". Also in the case of the "1H" prediction, an achieved improvement is 0.33 to 0.30, that is, about ten percent.

As summary of above explanations on FIGS. 20 to 23, the coding of this embodiment has reduced an average current further by about ten percent.

In this way, in the first embodiment, since the channel code is directly generated from modulo reduced data and is supplied to the transmission lines 3, the internal configuration of the timing controller 2 has been simplified. The multi-valuation has successfully reduced the wiring count of the transmission lines 3 and to suppress EMI radiation. In addition, power consumption has been reduced, because the channel code is configured to decrease the average current by considering with occurrence probability.

SECOND EMBODIMENT

Although the first embodiment transmits data by using the 4-valued channel code, a second embodiment performs transmission with 16-valued channel code.

FIGS. 26 and 27 are lists showing an example of correspondence between the modulo reduced data and channel code when generating the 16-valued channel code. As shown in these lists, modulo reduced data is classified into totally 31 groups. FIGS. 26 and 27 contain four items: "Code GR", "Input range", "Quantity" and "Code average amplitude", where the "Code GR" shows a serial number to identify each group, the "Input range" shows the range of corresponding modulo reduced data, the "Quantity" shows the count of code belonging to each group, the "Code average amplitude" shows average amplitude of the channel code.

FIG. 28 is a list showing values of respective components and average amplitude of the channel code in the group 15. Let each color of RGB be 256-gradation image data. The channel code needs two components when the modulo reduced data is converted into the 16-valued channel code. Hereafter, ($\Delta 1$, $\Delta 0$) will denote this two components, which construct the channel code.

As shown in FIG. 28, in the group 15, each component of the channel code potentially has a value 0 to 15. Here, the sum of amplitude of "$\Delta 1$" and "$\Delta 0$" is constantly 15. For this reason, average amplitude becomes $15/2=7.5$.

Average amplitude becomes larger as a serial number of a group is larger. The count of codes in a group decrease gradually for the group 16 and rest groups (whose average amplitude is eight or more), .

FIG. 29 is a list showing correspondence among the modulo reduced data, channel code, average amplitude of the channel code, and the occurrence probability. Similarly to FIG. 17, since the modulo reduced data $\epsilon=0$ has the highest occurrence probability p(0), the channel code (00) in the group 0 with the smallest amplitude is assigned to the data $\epsilon=0$. Hereafter, channel codes with smaller values are sequentially assigned to the groups with smaller serial numbers first. Thereby, a channel code with smaller average amplitude has a high occurrence probability.

As mentioned above, since any channel code has the same average amplitude so long as code belongs to the same group, reordering of data within the group is admissible.

FIG. 30 is a list showing an example of correspondence between the modulo reduced data and channel code which are obtained finally. FIG. 30 shows an example, and as mentioned above, partial reordering of data works effectively to simplify hardware configuration. In FIG. 30, the channel code and average amplitude are partially shown with respect to the modulo reduced data.

FIG. 30 explains the "$\Delta 0$" component of channel code. $\Delta 0=0, 1, 0, 2 \ldots$ are assigned for the modulo reduced data $\epsilon=0$, +1, −1, +2 . . . In the inverse order, $\Delta 0=15, 14, 15$ and 13 are assigned to $\epsilon=128, -127, +127, -126 \ldots$ (it is not shown.) That is, a sum of a coding value and its complement coding value (found in the corresponding location from the reverse order) is always 15. For example, 0+15=15, 1+14=15, 0+15=15, 2+13=15. This means that a half of a code table of 0 to 64 decides the rest half. This corresponding is formulated as follows: when a data $\epsilon$="k" has a code $\Delta 0$="j", its complement data $\epsilon=-(128-k)$ has a corresponded code $\Delta 0$="15−j". From the corresponding, a table of k=0 to 64 gives a procedure to configure a table of 128 to −(128−64). That is, a half-sized table is sufficient to configure whole table, although an extra adder for "15−j" is required. There is such a corresponding concerning "$\Delta 1$". Returning to FIG. 18 again in this aspect, the same procedure is apparently applicable concerning "$\Delta 3$" to "$\Delta 0$" respectively. In this case, a key number of corresponding is not 15 but is 3: when $\epsilon$="k" has a code $\Delta 0$="j", the complement $\epsilon=-(128-k)$ has a corresponded code $\Delta 0$="3−j". Hence, the code tables have reduced.

FIG. 31 is a diagram showing an example of transmission timing of the channel code supplied to the transmission lines 3 from the timing controller 2. Since the 16-valued channel code is generated, the wiring count of the transmission lines 3 is reduced from the conventional twelve lines to three lines, i.e. one fourth of the conventional example. In addition, the wiring count of the transmission lines 3 is a half of the wiring count in FIG. 19.

In this way, in the second embodiment, by increasing the level of multi-values (from 4-valued to 16-valued), the wiring count of the transmission lines 3 has been reduced compared with the first embodiment, thereby suppressing EMI radiation. In addition, similarly to the first embodiment, power consumption has been reduced.

What is claimed is:

1. An image transmitter, comprising:
   a color difference differential calculating unit configured to calculate color difference differential data relating to a difference between a current predicting value predicted based on previous image data and current actual image data;
   a multi-valued generator configured to generate multi-valued data corresponding to the color difference differential data based on the color difference differential data, statistical properties of the image data and a signal amplitude of the multi-valued data to be generated; and
   a transmitter configured to transmit the multi-valued data through at least one transmission line.

2. The image transmitter according to claim 1,
   wherein the multi-valued generator generates the multi-valued data having a signal amplitude as small as possible.

3. The image transmitter according to claim 1,
   wherein the multi-valued generator generates the multi-valued data having smaller signal amplitude as occurrence probability of the color difference differential data is higher.

4. The image transmitter according to claim 1,
   wherein the multi-valued generator classifies the multi-valued data into a plurality of groups in order of amplitude, allocates each of the color difference differential data to a corresponding group based on the occurrence probability, and selects the multi-valued data corresponding to each of the color difference differential data among the multi-valued data belonging to the allocated group.

5. The image transmitter according to claim 4,
   wherein when a plurality of color difference differential data are allocated in the same group, the multi-valued generator selects the multi-valued data corresponding to the color difference differential data in the group to minimize circuit size.

6. The image transmitter according to claim 1, comprising a modulo reduction unit configured to generate the modulo reduced data of the color difference differential data,
   wherein the multi-valued generator generates the multi-valued data corresponding to the modulo reduced data.

7. The image transmitter according to claim 6,
   wherein the modulo reduction unit generates the modulo reduced data which can completely restore the original color difference differential data and has the width of bits less than that of the original color difference differential data.

8. The image transmitter according to claim 6,
   wherein the modulo reduction unit generates multiple types of modulo reduced data;
   the multi-valued generator generates multiple types of multi-valued data corresponding to the multiple types of modulo reduced data; and the transmitter transmits the multiple types of multi-valued data through at least one transmission line.

9. An image receiver, comprising:

a receiver configured to receive multi-valued data generated based on color difference differential data relating to a difference between a current predicting value predicted by a previous image data and current actual image data, statistical properties of the image data, and a signal amplitude of the multi-valued data to be generated, through at least one transmission line;

a decoder configured to decode the received multi-valued data to generate the color difference differential data relating to a difference between color difference data corresponding the current actual image data and color difference data predicted by the previous image data; and an image restoring unit configured to restore the current actual image data based on the color difference differential data.

10. The image receiver according to claim 9, wherein the signal amplitude is smaller as occurrence probability of the multi-valued data corresponding to the color difference differential data is higher.

11. The image receiver according to claim 9, wherein the decoder classifies the multi-valued data into a plurality of groups in order of amplitude, allocates each of the color difference differential data to a corresponding group based on the occurrence probability, and selects the corresponding multi-valued data among the group that the multi-valued data belongs.

12. The image receiver according to claim 9, further comprising a modulo reduction restoring unit configured to restore the multi-valued data to the original modulo reduced data, wherein the decoder generates the multi-valued data corresponding to the restored modulo reduced data.

13. The image receiver according to claim 12, wherein the modulo reduction restoring unit generates the modulo reduced data which can completely restore the original color difference differential data, and has the width of bits less than that of the original color difference data.

14. The image receiver according to claim 9, wherein the receiver receives multiple types of multi-valued data through at least one transmission line; and the modulo reduction restoring unit generates multiple types of modulo reduced data corresponding to the multiple types of multi-valued data.

15. An image transmission system, comprising:

an image transmitter configured to transmit image data; and an image receiver configured to receive the image data, wherein the image transmitter includes:

a color difference differential calculating unit configured to calculate color difference differential data relating to a difference between a current predicting value predicted based on previous image data and current actual image data;

a multi-valued generator configured to generate multi-valued data corresponding to the color difference differential data based on the color difference differential data, statistical properties of the image data and a signal amplitude of the multi-valued data to be generated; and a transmitter configured to transmit the multi-valued data through at least one transmission line, and wherein the image receiver includes:

a receiver configured to receive the multi-valued data transmitted via the transmission line;

a decoder configured to decode the received multi-valued data to generate the color difference differential data relating to a difference between color difference data corresponding the current actual image data and color difference data corresponding to a current predicting value predicted by the previous image data; and an image restoring unit configured to restore the current actual image data based on the color difference differential data.

16. The image transmission system according to claim 15, wherein the multi-valued generator classifies the multi-valued data into a plurality of groups in order of amplitude, allocates each of the color difference differential data to a corresponding group based on the occurrence probability, and selects the multi-valued data corresponding to each of the color difference differential data among the multi-valued data belonging to the allocated group.

17. The image transmission system according to claim 16, wherein when a plurality of color difference differential data are allocated in the same group, the multi-valued generator selects the multi-valued data corresponding to the color difference differential data in the group to minimize circuit size.

18. The image transmission system according to claim 15, comprising a modulo reduction unit configured to generate the modulo reduced data of the color difference differential data, wherein the multi-valued generator generates the multi-valued data corresponding to the modulo reduced data.

19. The image transmission system according to claim 18, wherein the modulo reduction unit generates the modulo reduced data which can completely restore the original color difference differential data and has the width of bits less than that of the original color difference differential data.

20. The image transmission system according to claim 18, wherein the modulo reduction unit generates multiple types of module reduction data;

the multi-valued generator generates multiple types of multi-valued data corresponding to the multiple types of modulo reduced data; and the transmitter transmits the multiple types of multi-valued data through at least one transmission line.

* * * * *